US012562925B2

(12) United States Patent
Best

(10) Patent No.: US 12,562,925 B2
(45) Date of Patent: Feb. 24, 2026

(54) DETERMINING A PHYSICALLY UNCLONABLE FUNCTION (PUF) SELECTION VECTOR

(71) Applicant: CRYPTOGRAPHY RESEARCH, INC., San Jose, CA (US)

(72) Inventor: Scott C. Best, Palo Alto, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 150 days.

(21) Appl. No.: 18/591,554

(22) Filed: Feb. 29, 2024

(65) Prior Publication Data

US 2024/0313986 A1      Sep. 19, 2024

Related U.S. Application Data

(60) Provisional application No. 63/464,878, filed on May 8, 2023, provisional application No. 63/453,049, filed on Mar. 17, 2023.

(51) Int. Cl.
    H04L 9/32          (2006.01)
    H04L 9/08          (2006.01)
(52) U.S. Cl.
    CPC .......... H04L 9/3278 (2013.01); H04L 9/0869 (2013.01)
(58) Field of Classification Search
    CPC ........ H04L 9/3278; H04L 9/0869; H04L 9/32
    See application file for complete search history.

(56) References Cited

U.S. PATENT DOCUMENTS

| | | | |
|---|---|---|---|
| 9,262,256 B2 | 2/2016 | Mathew et al. | |
| 9,584,329 B1 | 2/2017 | Trimberger | |
| 9,992,031 B2 | 6/2018 | Gotze et al. | |
| 2018/0006813 A1* | 1/2018 | Van Der Leest | ........ G09C 1/00 |
| 2019/0378575 A1 | 12/2019 | Lu | |
| 2021/0026602 A1* | 1/2021 | Wu | ........................ H03L 7/0994 |

OTHER PUBLICATIONS

Hunt-Schroeder, Eric et al., "Pre-Amplifier Based Entropy Source with Stable Output for use in a Physical Unclonable Function", 2021 IEEE Microelectronics Design & Test Symposium (MDTS), 2021, DOI: 10.1109/MDTS52103.2021.9476114. 6 pages.

* cited by examiner

*Primary Examiner* — Quazi Farooqui
(74) *Attorney, Agent, or Firm* — Lowenstein Sandler LLP

(57)          ABSTRACT

Technologies for generating an M-bit selection vector for a selector circuit that receives as input M binary values from a set of entropy-generation elements and outputs N binary values responsive to the M-bit selection vector are described. N bits in the M-bit selection vector are set to a first logic state, and M-N bits of the M-bit selection vector are set to a second logic state. A determination of which N bits in the M-bit selection vector are set to the first logic state is determined by a process. The process includes determining an accumulated Hamming weight value for M bit positions of the M-bit selection vector using K samples and identifying N bit positions in the M-bit selection vector using the accumulated Hamming weight values. The process sets the N bits corresponding to the N bit positions in the M-bit selection vector to the first logic state.

20 Claims, 8 Drawing Sheets

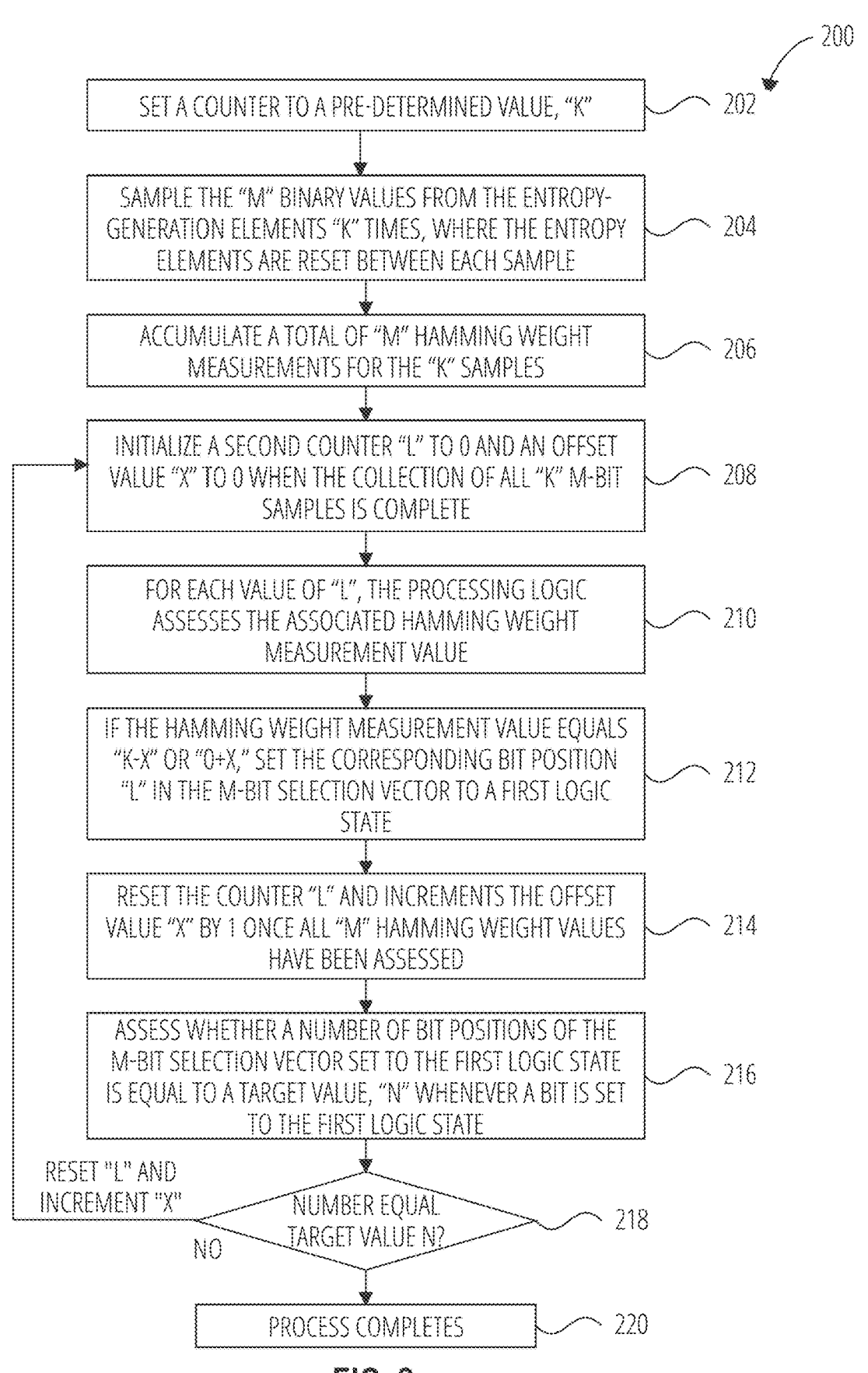

200

SET A COUNTER TO A PRE-DETERMINED VALUE, "K" — 202

SAMPLE THE "M" BINARY VALUES FROM THE ENTROPY-GENERATION ELEMENTS "K" TIMES, WHERE THE ENTROPY ELEMENTS ARE RESET BETWEEN EACH SAMPLE — 204

ACCUMULATE A TOTAL OF "M" HAMMING WEIGHT MEASUREMENTS FOR THE "K" SAMPLES — 206

INITIALIZE A SECOND COUNTER "L" TO 0 AND AN OFFSET VALUE "X" TO 0 WHEN THE COLLECTION OF ALL "K" M-BIT SAMPLES IS COMPLETE — 208

FOR EACH VALUE OF "L", THE PROCESSING LOGIC ASSESSES THE ASSOCIATED HAMMING WEIGHT MEASUREMENT VALUE — 210

IF THE HAMMING WEIGHT MEASUREMENT VALUE EQUALS "K-X" OR "0+X," SET THE CORRESPONDING BIT POSITION "L" IN THE M-BIT SELECTION VECTOR TO A FIRST LOGIC STATE — 212

RESET THE COUNTER "L" AND INCREMENTS THE OFFSET VALUE "X" BY 1 ONCE ALL "M" HAMMING WEIGHT VALUES HAVE BEEN ASSESSED — 214

ASSESS WHETHER A NUMBER OF BIT POSITIONS OF THE M-BIT SELECTION VECTOR SET TO THE FIRST LOGIC STATE IS EQUAL TO A TARGET VALUE, "N" WHENEVER A BIT IS SET TO THE FIRST LOGIC STATE — 216

RESET "L" AND INCREMENT "X"

NUMBER EQUAL TARGET VALUE N? — 218

NO

PROCESS COMPLETES — 220

FIG. 2

SAMPLE A SET OF ENTROPY-GENERATION ELEMENTS TO GENERATE K SAMPLES, WHEREIN EACH SAMPLE OF THE K SAMPLES HAS M-BITS CORRESPONDING TO M BIT POSITIONS OF AN M-BIT SELECTION VECTOR, AND WHEREIN THE SET OF ENTROPY-GENERATION ELEMENTS IS RESET BETWEEN EACH SAMPLE BEING GENERATED 602

DETERMINE AN ACCUMULATED HAMMING WEIGHT VALUE FOR EACH OF THE M BIT POSITIONS OF THE M-BIT SELECTION VECTOR USING THE K SAMPLES 604

IDENTIFY, USING THE ACCUMULATED HAMMING WEIGHT VALUES, N BIT POSITIONS IN THE M-BIT SELECTION VECTOR, WHEREIN M IS LARGER THAN N 606

SET N BITS CORRESPONDING TO THE N BIT POSITIONS IN THE M-BIT SELECTION VECTOR TO A FIRST LOGIC STATE, WHEREIN M-N BITS OF THE M-BIT SELECTION VECTOR ARE SET TO A SECOND LOGIC STATE 608

STORE THE M-BIT SELECTION VECTOR AS AT LEAST A PORTION OF HELPER DATA ASSOCIATED WITH A DEVICE COMPRISING THE SET OF ENTROPY-GENERATION ELEMENTS 610

DEVICE

706

PHYSICALLY
UNCLONABLE
FUNCTION
(PUF)  704

DEVICE
COMPONENTS
708

712

710
MEMORY

SELECTION
VECTOR

702

712

DETERMINING A PHYSICALLY UNCLONABLE FUNCTION (PUF) SELECTION VECTOR

RELATED APPLICATIONS

This application claims the benefit of U.S. Provisional Application No. 63/453,049, filed Mar. 17, 2023, and U.S. Provisional Application No. 63/464,878, filed May 8, 2023, the entire contents of all applications are incorporated by reference.

BACKGROUND

Cryptographic operations typically involve the use of secrets, including secret keys. There are several ways secret keys can be provided to the operational units of a cryptographic system, but the most tamper-resistant means is by deriving the keys, only when needed (i.e., on demand), by a tamper-resistant key-derivation function. This type of function, when performed by an on-chip circuit, typically combines several different "seeds" to form the final key, where these seeds are data values that exist within the chip. Some seed data might be programmed into non-volatile memory, some might be obtained from off-chip components, and some might be defined as constants within the digital logic itself. In highly tamper-resistant systems, however, at least one of the seeds is "self-generated" by the chip itself. The type of circuit which can self-generate a reliable output is known as a "physically unclonable function," ("PUF") and it relies on the random manufacturing variations between nominally identical chips in order to self-generate a data value which can be used in the derivation of a secret key value. However, as the PUF circuit necessary relies on random effects, it requires some degree of stabilization so that the outputs it self-generates can be "random but stable", and so can be relied on for the duration of the chip's lifetime operation.

BRIEF DESCRIPTION OF THE DRAWINGS

The present disclosure is illustrated by way of example, and not by way of limitation, in the figures of the accompanying drawings.

FIG. 2 illustrates an aspect of the subject matter in accordance with one embodiment.

FIG. 6 is a flow diagram of a method for generating a selection vector according to at least one embodiment.

DETAILED DESCRIPTION

Figure 1:
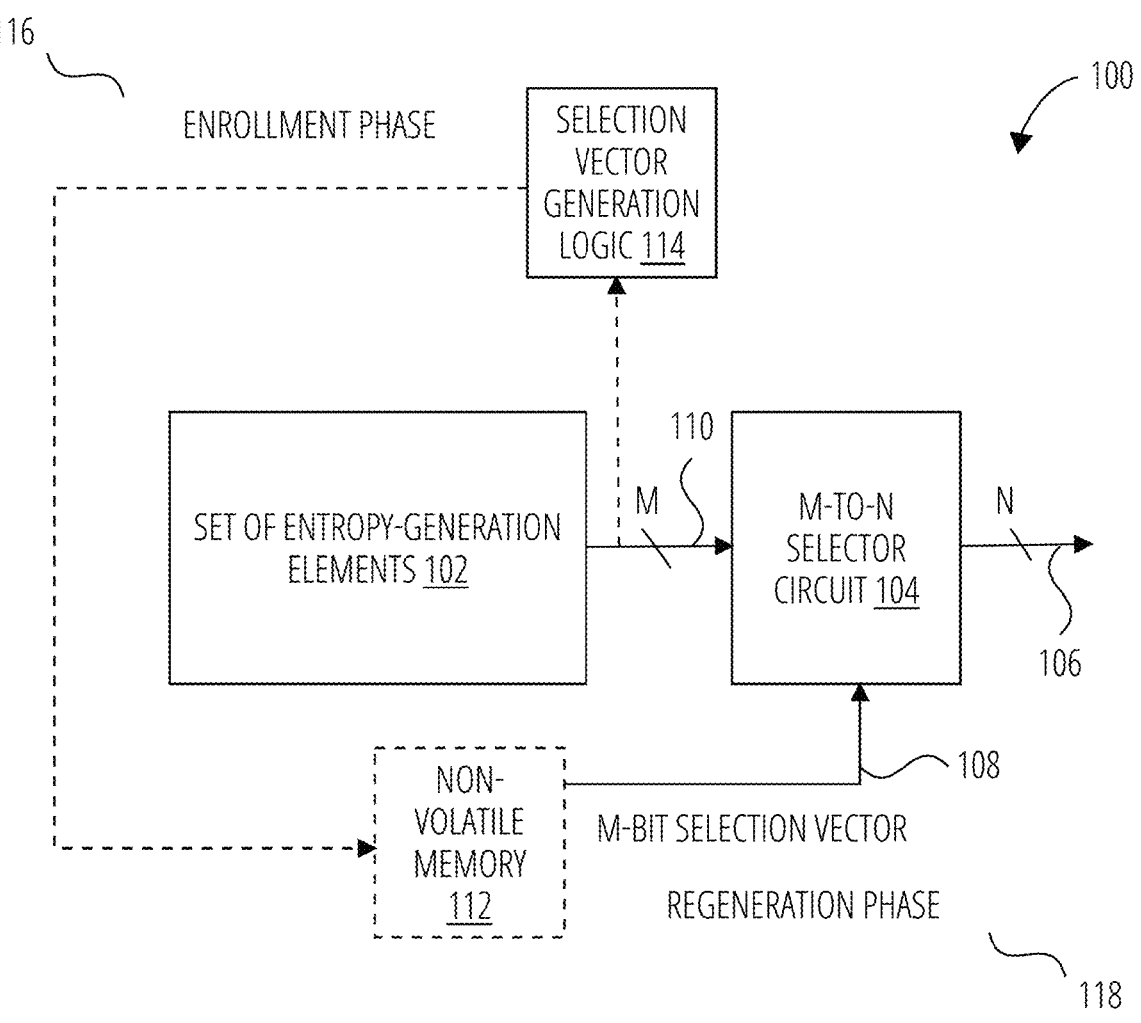
FIG. 1 is a block diagram of a PUF circuit having an entropy pool combined with a selector circuit to provide a PUF output according to at least one embodiment.

Technologies for generating an M-bit selection vector for a selector circuit that receives as input M binary values from a set of entropy-generation elements and outputs N binary values responsive to the M-bit selection vector are described. N bits in the M-bit selection vector are set to a first logic state, and M-N bits of the M-bit selection vector are set to a second logic state. A determination of which N bits in the M-bit selection vector are set to the first logic state is determined by a process. The process includes determining an accumulated Hamming weight value for M bit positions of the M-bit selection vector using K samples and identifying N bit positions in the M-bit selection vector using the accumulated Hamming weight values. The process sets the N bits corresponding to the N bit positions in the M-bit selection vector to the first logic state.

The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

Aspects of the present disclosure are directed to generating a selection vector for a selector circuit associated with entropy-generation elements associated with a physical variation of a device. In general, a semiconductor device may include physical variations as a result of the semiconductor fabrication process of the semiconductor device. The physical variations may be unique to a particular semiconductor device. For example, the physical variation may be a unique hardware characteristic or behavior of the semiconductor device. The physical variation may be randomly introduced to the semiconductor device as part of the semiconductor fabrication process. Such a physical variation in a semiconductor device may be associated with a physically unclonable function (PUF) (or PUF circuit) that generates a value that is representative of the physical variation. PUFs are a class of security primitives that can be used to provide secure authentication and identification of physical objects, such as electronic devices or smart cards. PUFs are based on the physical properties of a device, which are unique and difficult to clone or replicate.

The basic idea behind PUFs is to use physical variations that naturally occur during the manufacturing process to create a unique and unpredictable response from the device. These variations can include almost any difference which results in a measurable electrical effect, including: the thickness of the gate oxide layer, variations in the doping levels of the transistors, variations in the impedance or placement of metal traces on the chip, etc. PUFs typically work by digitizing the pool of entropy elements, isolating a limited number of the elements, and then applying error-correction techniques to the limited subset to resolve a final output value. The output is then typically a binary string of bits unique to that particular device. The output can be used as a "digital fingerprint for the device," which can be stored and used for later authentication or identification purposes, or as one of several seeds for key material generation. Because the physical variations that are used to generate the response are random and difficult to control, it is considered infeasible to create a duplicate device that generates the same output as the original device. This makes PUFs difficult to clone or replicate and very useful for securing sensitive information or preventing counterfeiting of physical objects.

PUFs have a wide range of applications, including: secure authentication of electronic devices, anti-counterfeiting measures for consumer products, securing the storage of secret data, for deriving cryptographic keys, etc. However, PUFs are difficult circuits to develop because of the natural tension between entropy and stability through error correction. Without sufficient entropy, the PUF output is too predictable. With an over-abundance of entropy, the PUF output cannot be stabilized with error-correction codes for long-term stability.

The PUF may be used to generate secret target data that is used to perform operations at a device. For example, the PUF may correspond to an unpredictable or unknown but constant value for a particular semiconductor device. The value corresponding to the PUF may be used to generate a secret cryptographic key to be used by the device. To insure stability of the secret cryptographic key for the duration of the chip's operational lifetime, additional data (generally known as "helper data" or "public data") is often used to ensure reliable regeneration of the expected output data. Generally speaking, the process for creating a PUF output value and its associated helper data image is known as "enrollment," while the process for using the helper data image to recreate the output value is known as "regeneration."

For example, the PUF entropy pool may consist of a plurality of circuits that—after digitization—each produce either a digital value of '0' or a value of '1' at an activation time. The generation of 0 or 1 is intended to be random, but due to manufacturing variation, the output of each entropy pool element will be biased towards one value or the other. The helper data may identify which particular bits of the entropy pool are the "most biased" ones, and so should be selected and used during calculation of the PUF's output value. The helper data may be generated (during the "enrollment" phase) by the PUF after the assessment of entropy pool elements is complete, and the helper data may be stored in memory. Subsequently (during the "regeneration" phase), the helper data may be retrieved from the memory and provided to the PUF at a later time so that the corresponding values of the PUF may be selected to generate the same output data. As a result, the helper data may be used to select particular bits of a repeatable but random value of the PUF to generate the target data.

As described above, PUFs have two modes of operation: enrollment and regeneration. An enrollment process is performed once for each unique output, usually just before the completed chip is ready for final product activation. A regeneration process can be performed in situ when the unique output is needed. The regeneration process can be performed multiple times. The helper data is generated and output during the enrollment process. The helper data is used as an input during the regeneration process. The helper data can include a data value (aka, a "selection vector") that is used by a selector circuit to select which elements from the PUFs entropy pool are used during production of the PUF output. As described above, PUFs, even with helper data, are difficult circuits to develop not only because of a natural tension between entropy and error correction, but also because of aging effects on the bias of the isolated entropy elements.

Aspects and embodiments of the present disclosure address the above and other deficiencies by providing a selection vector suitable for stabilization and subsequent error correction for long-term PUF stability. The embodiments described herein are related to the technology for generating a selection vector during an enrollment process and the use of the generated selection vector during a regeneration process. The proposed embodiments of creating a selection vector to identify which elements in a pool of entropy-generating circuits should be used as part of a PUF output. The proposed methods are independent of the exact nature of the entropy-generating circuits. For example, the PUFs can be silicon PUFs, optical PUFs, magnetic PUFs, or the like. The proposed methods are independent of the exact nature of the PUF output generation. Representative examples of both will be described herein, but the methods are suitable for a wide variety of approaches.

Advantages of the present disclosure include, but are not limited to, improved security and long-term stability in the target data. For example, the operations of a device that uses the PUF to generate a target data corresponding to a cryptographic key when performing the operations may be more reliable and secure because of this approach.

FIG. 1 is a block diagram of a PUF circuit 100 having an entropy pool 102 combined with a selector circuit 104 to provide a PUF output based on a selection vector according to at least one embodiment. The entropy pool 102 includes a set of entropy-generation elements that—after digitization—produce an M-bit binary output 110, where M can be any positive integer (e.g., 4096). The selector circuit 104 can be an M-to-N selector circuit, which filters the M-bit output 110 to an N-bit PUF output 106, responsive to the selection vector 108, where M is larger than N. For example, while M might be 4096, N might be 512. In at least one embodiment, a bitsize of the selection vector 108 is the same size as the number of outputs of the entropy pool 102 (e.g., M-bit selection vector). For example, there may be 4096 entropy-generating circuits within the entropy pool 102, and the bitsize of the M-bit selection vector may be 4096 bits.

In at least one embodiment, a number of bits programmed to a specific logic state within the M-bit selection vector is the same size as "N," the number of outputs of the selector circuit 104. For example, while there may be 4096 bits in the selection vector 108, exactly 512 of them may be set to a first binary value (e.g., a first logic state, e.g. binary '1'), while the remaining 3584 are set to the opposite binary value (e.g., second logic state, e.g. binary '0').

In at least one embodiment, the programming states of the bits in the selection vector 108 (e.g., M-bit selection vector) are determined during an "enrollment phase" 116 of the PUF circuit 100. The selection vector 108 can be stored in non-volatile memory 112 for subsequent use, such as during a "regeneration phase" 118 (also referred to as regeneration mode) of the PUF circuit 100. Note that while an adversary might be able to access the selection vector 108 data, it doesn't on its own communicate any information about the PUF output value. That is, it only communicates what entropy elements are used, not what their secret binary output value is.

In enrollment phase 116, a selection vector generation logic 114 can perform an enrollment process to generate a selection vector 108, as described in more detail below. The selection vector generation logic 114 can store the selection vector 108 in the non-volatile memory 112. The selection vector generation logic 114 can be processing logic that may comprise hardware (e.g., circuitry, dedicated logic, programmable logic, microcode, etc.), software (e.g., instructions run on a processing device to perform hardware simulation), or a combination thereof. In at least one embodiment, the selection vector generation logic 114 can be part of the PUF circuit 100. In at least one embodiment, the selection vector generation logic 114 can be part of a processing core of a device containing the PUF circuit 100. The processing core can be a cryptographic core such as a security processor. The cryptographic core can be a hardware module that performs cryptographic functions, such as encryption, decryption, key generation, authentication, etc. The cryptographic core can be integrated into a larger system, such as a microprocessor, a microcontroller, a System on Chip (SoC), etc. The cryptographic core can use the PUF output 106 to perform operations, such as cryptographic operations. The cryptographic core can be used in a wide range of applications, for example, secure communications, financial transactions, digital rights management, security systems, encrypting and decrypting data in motion and data at rest, or the like. The cryptographic core can be used in embedded systems, such as smart cards, mobile devices, and Internet of Things (IoT) devices, to provide secure authentication, data integrity, data protection, or the like. The cryptographic core can also be implemented using dedicated hardware, software, or a combination of both. In other embodiments, the PUF circuit 100 can be integrated into other systems without being part of a cryptographic core.

In regeneration phase 118, as part of a regeneration process, the selector circuit 104 can receive the selection vector 108 as an input to produce the PUF output 106 based on the M-bit output 110 from the entropy pool 102. An example method for generating a selection vector is described below with respect to FIG. 2. An exemplary process for generating a 4096-bit selection vector is described in detail below with respect to FIG. 3.

FIG. 2 is a flow diagram of a method 200 for generating a selection vector during an enrollment process according to at least one embodiment. The method 200 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 200 is performed by the PUF circuit 100 of FIG. 1. In another embodiment, the method 200 is performed by the selection vector generation logic 114 of FIG. 1. In another embodiment, the method 200 is performed by a device having the PUF circuit 100 of FIG. 1. The method 200 is described below with respect to a PUF circuit having a set of entropy-generation elements which, in response to a sample signal, provide at least "M" binary values to a selector circuit. The selector circuit receives as input "M" binary values from the entropy-generation elements and outputs "N" binary values, responsive to an M-bit selection vector, where "M" is larger than "N," and where "N" of the bits in the M-bit selection vector are set to a first logic state, while "M-N" of the bits are set to the opposite logic state. A determination of which "N" bits of the M-bit selection vector get set to the first logic state is determined by the method 200.

Referring to FIG. 2, the method 200 begins with the processing logic setting a counter to a pre-determined value, "K" (block 202). The processing logic samples the "M" binary values from the entropy-generation elements "K"

times, where the entropy elements are reset between each sample (block 204). The processing logic accumulates a total of "M" Hamming Weight measurement values: an independent measure for each bit, for each of the "K" samples (block 206). For example, with K=16 and M=4096, the total data size of the Hamming Weight measurement array is at least 2.5 kbytes (4096*5 bits, the minimum binary counter size needed for decimal 16). The processing logic initializes a second counter "L" to 0 and an offset value "X" to 0 when the collection of all "K" M-bit samples is complete (block 208). For each value of "L," the processing logic assesses the associated Hamming Weight measurement value (block 210). If the Hamming Weight measurement value equals "K−X" or "0+X," the processing logic sets the corresponding bit position "L" in the M-bit selection vector to a first logic state (block 212). In other words, if a particular entropy element generated the same binary output value of 0 or 1 for each of K=16 samples, its accumulated Hamming Weight would be either 0 or 16. Whenever a bit is set to the first logic state within the M-bit selection vector, the processing logic assesses whether a number of bit positions of the M-bit selection vector set to the first logic state equals a target value, "N." If the number equals the target value "N," the process completes (block 220). Otherwise, the process of checking for the two Hamming weights continues, returning to block 208 while resetting the second counter "L" and incrementing the offset value "X." In this way, the "most stable elements" within the PUF entropy pool can be identified and then recorded within the selection vector.

In at least one embodiment, the selection of which of the 4096 Hamming Weight accumulation counters to assess is determined (i.e. the value "L") by the output of a maximum-length linear-feedback shift register (LFSR) whose sequence size is the same as "M," rather than by the use of a second counter for "L." In this embodiment, the maximum-length LFSR can be seeded with a random value derived from one or more of the M-bit samples from the entropy-generation elements.

Figure 3:
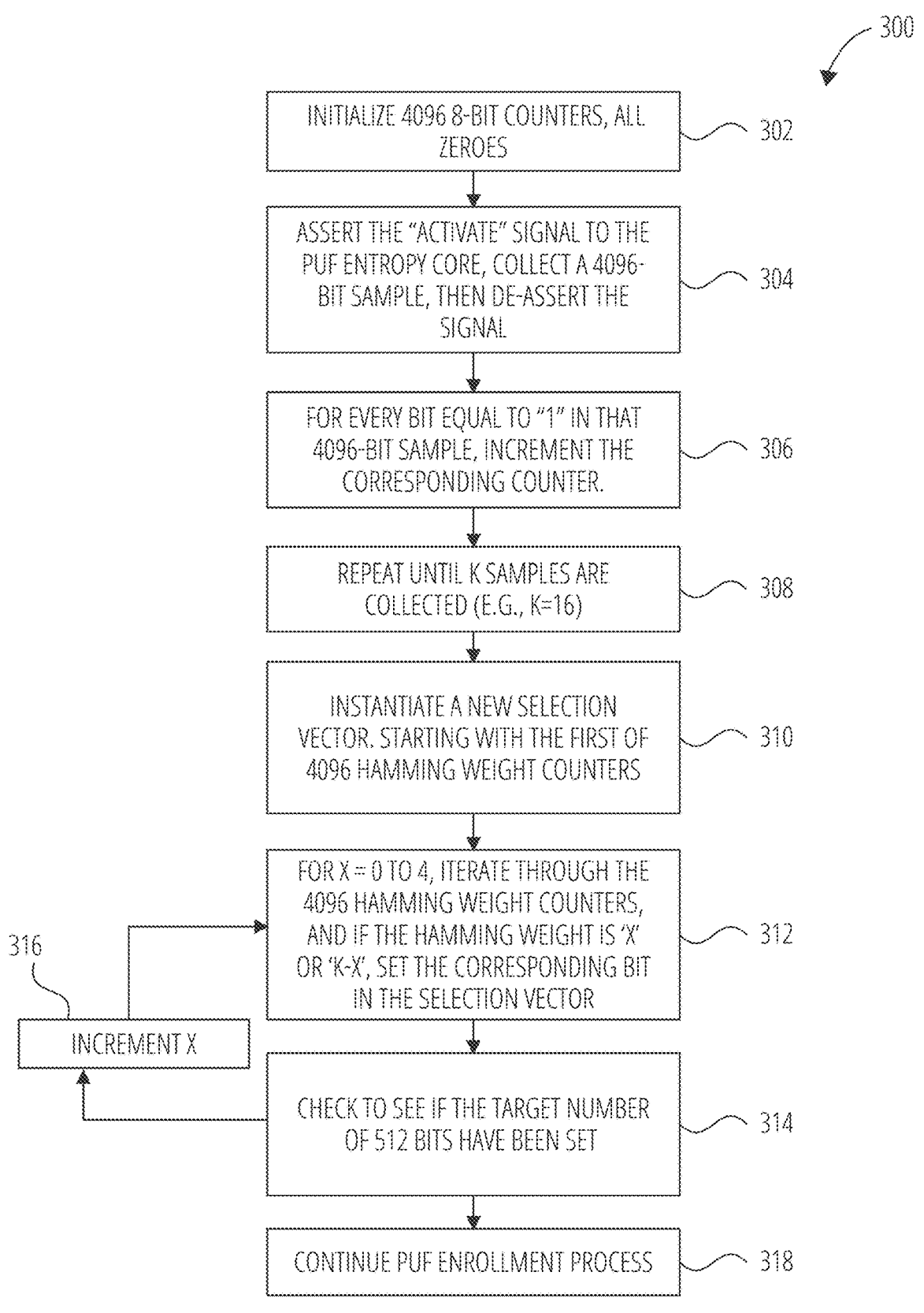
FIG. 3 is a flow diagram of a method for generating a selection vector during an enrollment process according to at least one embodiment.

FIG. 3 is a flow diagram of a method 300 for generating a selection vector during an enrollment process according to at least one embodiment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by the PUF circuit 100 of FIG. 1. In another embodiment, the method 300 is performed by the selection vector generation logic 114 of FIG. 1. In another embodiment, the method 300 is performed by a device having the PUF circuit 100 of FIG. 1.

Referring to FIG. 3, the method 300 begins with the processing logic initializing 4096 8-bit counters to all zeros (block 302). Each of the 4096 8-bit counters corresponds to one bit position of an output of a PUF Entropy Core (e.g., the entropy pool 102). The processing logic asserts an "activate" signal to the PUF Entropy Core to collect a 4096-bit sample from the entropy pool 102, then de-assert the "activate" signal (block 304). For every bit equal to "1" in that 4096-bit sample, the processing logic increments the corresponding counters (block 306). These counters can measure a bitwise Hamming weight of every bit position of the 4096 PUF Entropy Core output across samples, which can be used to identify the "random but stable" bits in the PUF Entropy Core output. The processing logic can repeat until K samples are collected (block 308) (e.g., in an embodiment, K=16). The processing logic can instantiate a new selection vector (block 310), e.g. to all zeroes. Starting with the first of 4096 Hamming weight counters, the processing logic can use a FOR loop for X=0 to 4 to iterate through the 4096 Hamming weight counters, and if the Hamming weights are 'X' or 'K–X,' the processing logic can set the corresponding bit in the selection vector (block 312), e.g. to a logic 1. For example, on the first pass of the FOR loop, X=0, so if the Hamming weight of counter 13 is zero ("0"), the processing logic sets the 13th bit in the selection vector to one ("1"). If the Hamming weight of the counter 247 is 16, the processing logic sets the 247th bit in the selection vector to one ("1"). Each time a bit is set in the selection vector, the processing logic checks to see if the target number of 512 bits have been set (block 314). If 512 bits are set at block 314, the FOR loop can be broken, and the processing logic can proceed to the next step in the PUF enrollment process (block 318). If less than 512 bits are set in the selection vector at block 314, the iteration can continue. If the iteration through all 4096 Hamming weight counters concludes without 512 bits being set in the selection vector, the FOR loop then increments X (block 316), and the iteration begins again. For example, on the second pass of the FOR loop, X=1, so if the Hamming weights are "1" or "K–1," the processing logic sets the corresponding bits in the selection vector. The processing logic repeats the iteration until either 512 bits are set in the selection vector or the processing logic is done assessing the 4096 Hamming weight counters (block 314). If working, the iteration and FOR loop end with a selection vector with 512 of the 4096 bits set to 1. If the iteration and FOR loop complete normally without obtaining 512 bits set, the processing logic can raise an error to indicate that the PUF enrollment process has failed. It should be noted that in this example K was set to 16 and the FOR loop was limited to 4. This is because entropy pool elements with an accumulated Hamming weight measurement of between 5 and 10 after 16 samples could be considered too entropic for use, and the selection vector should not include them.

Figure 4:
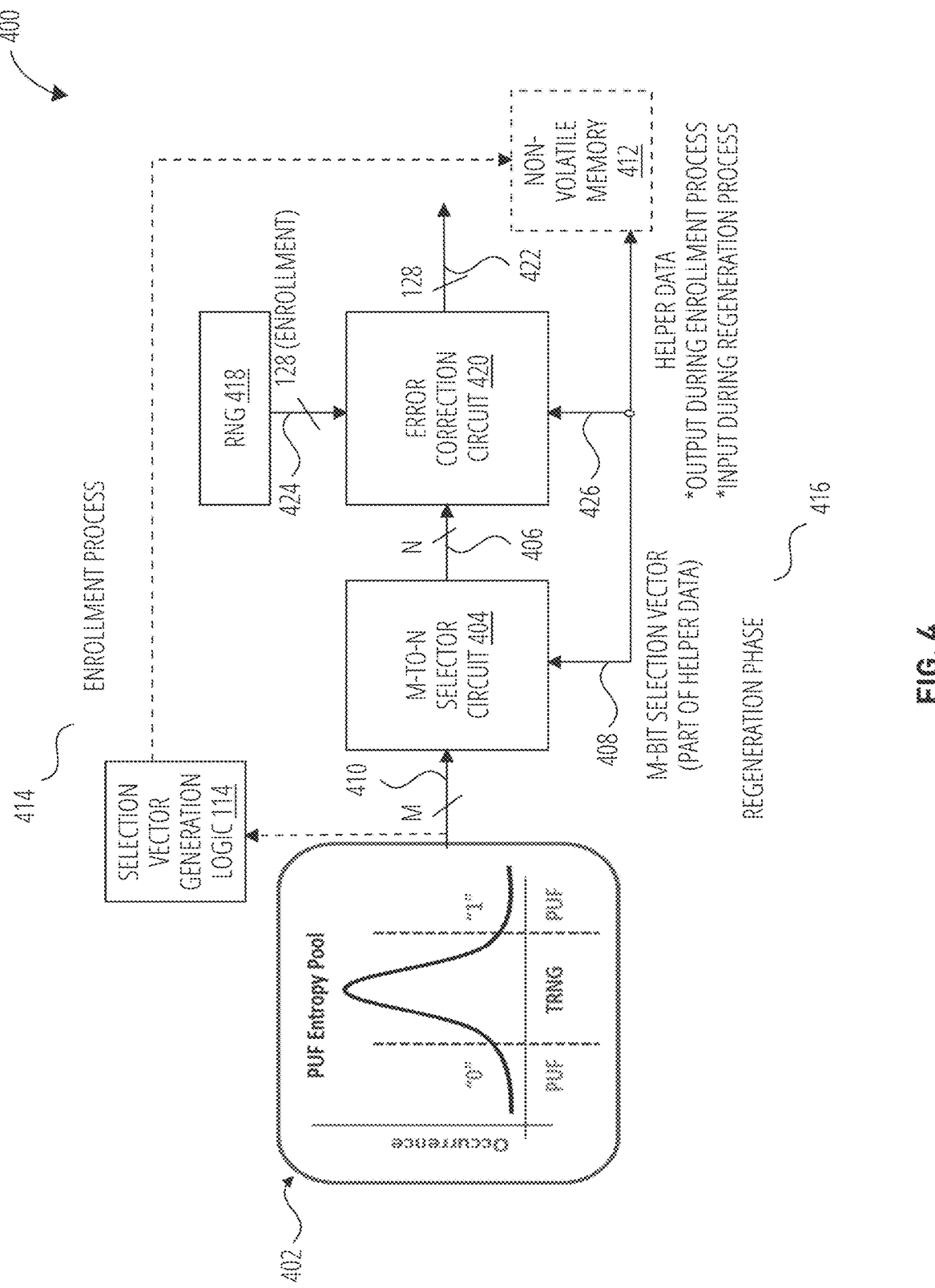
FIG. 4 is a block diagram of a PUF circuit having a PUF entropy pool, an M-to-N selector circuit, and an error correction circuit to provide a PUF output based on an M-bit selection vector according to at least one embodiment.

FIG. 4 is a block diagram of a PUF circuit 400 having a PUF entropy pool 402, an M-to-N selector circuit 404, and an error correction circuit 420 to provide a PUF output 422 based on an M-bit selection vector 408 according to at least one embodiment. The PUF entropy pool 402 includes a set of entropy-generation elements that produce an M-bit output 410, where M can be any positive integer (e.g., 4096). The M-to-N selector circuit 404 can filter the M-bit output 110 to provide N binary values 406 to the error correction circuit 420, responsive to the M-bit selection vector 408, where M is larger than N. For example, while M might be 4096, N might be 512. In at least one embodiment, a bitsize of the M-bit selection vector 408 is the same size as the number of outputs of the PUF entropy pool 402 (M). For example, there may be 4096 entropy-generation elements within the PUF entropy pool 402, and the bitsize of the M-bit selection vector may be 4096 bits.

As described above, the PUF circuit 400 can be used to generate a PUF output 422 that is used by a device to perform cryptographic operations. For example, the PUF output 422 may correspond to an unpredictable or unknown but constant value for a particular semiconductor device. The PUF output 422 can be used to generate a target data, such as a secret cryptographic key to be used by the device. Since the value corresponding to the different PUFs in different devices may be unknown and unpredictable, helper data 426 can be used to facilitate the generation of the expected target data when using the PUF output 422. For example, the helper data 426 can be used to determine which values corresponding to the PUF should be selected and used to generate the target data, as reflected in the M-bit selection vector 408. For example, the combination of the corresponding helper data 426, M-bit selection vector 408, and N binary values 406 can be used to generate the same PUF output 422 for long-term stability.

For example, the PUF entropy pool circuits may correspond to digital circuits which randomly produce a binary value of '0' or a value of '1' at an initialization. Due to random manufacturing variation, there will be a bias in the randomness seen at each element's output, such that the observed probability of some elements is an "always 0" output, while some elements are "always 1." The helper data 426, including the M-bit selection vector 408, can identify which particular biased bits of the entropy pool should be selected and used to generate the PUF output 422. The helper data 426 may be generated by the PUF circuit 400 after the M-bit selection vector 408 is generated. The helper data 426, including the M-bit selection vector 408, can be stored in memory, such as non-volatile memory 412 illustrated in FIG. 4. Subsequently, the helper data 426 can be retrieved from the non-volatile memory 412 and provided to the PUF circuit 400 at a later time. The PUF circuit 400 can use the M-bit selection vector 408 to determine which bits of the M-bit output 410 to use to produce N binary values 406. The helper data 426 can be used by the error correction circuit 420 to correct any errors in the N binary values 406 to ensure a stable value for the PUF output 422. As a result, the helper data 426 can be used to select particular bits of a repeatable but random value of the PUF circuit 400 to generate the PUF output 422. As described earlier, while an adversary might be able to access the helper data 426 (a.k.a., "public data"), it doesn't on its own communicate any information about the PUF output value. At most, it only communicates what entropy elements are used, not what their secret binary output value is.

Similar to the PUF circuit 100 described above, the PUF circuit 400 has two modes of operation, one mode for an enrollment process 414 and another for a regeneration phase 416. The PUF circuit 400 The enrollment process 414 can be performed once for each unique output, usually just before the completed chip is ready for final product activation. The regeneration phase 416 can be performed in situ whenever the output is needed. It is typical that the regeneration phase 416 will be performed a large number times (potentially once for every cryptographic operation of the chip), while the enrollment phase is typically only performed a small number of times during the chip's lifetime. The helper data 426 is generated and output during the enrollment process 414. The helper data 426 is used as an input during the regeneration enrollment process 414. The helper data 426 can include the M-bit selection vector 408. The M-to-N selector circuit 404 uses the M-bit selection vector 408 to select which bit positions of the M-bit output 410 are used to produce the N binary values 406.

During the enrollment process 414, a random number generator 418 (RNG) can provide a random value 424 to the error correction circuit 420. In this way, every enrollment process of any one chip will be different, resulting in a different PUF output value 422 as well as a different associated helper data 426. In some embodiments, the error correction circuit 420 utilizes the PUF output values in combination with error-correction algorithms to reliably reproduce this random value during regeneration. In this way, the PUF output 422 can be stabilized with error-correction codes for long-term stability.

In at least one embodiment, the M-bit selection vector 408 has a Hamming weight of "N. For example, "N" of the "M" entropy-generation elements may be useful for contributing to a random-but-stable PUF, while the other M-N entropy-generation elements may be too random for use in generating the PUF.

In at least one embodiment, the M-bit selection vector 408 can use "N-hot encoding." For example, if bit 13 is set M-bit selection vector 408, then the 13th bit in the M-bit output 410 is useful to generate the N binary values 406 and, consequently, a random but stable value for the PUF output 422.

In at least one embodiment, the PUF circuit 400 includes selection vector generation logic 114 that determines the M-bit selection vector 408. In at least one embodiment, the selection vector generation logic 114 can assess which of the M-bit output 410 from the PUF entropy pool 402 are random-but-stable. There are many ways to accomplish this, but in at least one embodiment, the selection vector generation logic 114 takes "K" samples of the "M" entropy elements of the PUF entropy pool 402, with a reset phase between each sample (e.g., sample, reset, sample, reset, etc.).

The selection vector generation logic 114 can determine the M-bit selection vector 408 in a similar manner to the selection vector 108 as described above with respect to FIG. 1. The selection vector generation logic 114 can perform the operations of method 200 and method 300 as described above. In at least one embodiment, the selection vector generation logic 114 collects 16 samples of 4096 entropy elements. The selection vector generation logic 114 accumulates the Hamming weight value bit position of the M-bit output 410. The selection vector generation logic 114 can store the accumulated Hamming weight values in a data structure like a hardware array. It should be noted that the data structure can be suitable for a CPU-resident method. In other cases, e.g. with a large number of samples or a large entropy pool, the data structure is too memory heavy for a hardware method (e.g., for K=32 and an entropy pool of 8192 bits, it would require a minimum of 6 kbytes of memory).

In the example above, the selection vector generation logic 114 can store a value between 0 and K (e.g., 16) in a hardware array of 4096 elements (e.g., HW[0:4095]). Once the "K" iteration is complete, the selection vector generation logic 114 can search for the random-but-stable bits using the accumulated Hamming weight values stored in the hardware array. In at least one embodiment, the selection vector generation logic 114 can initialize an offset value (e.g., X=0). The selection vector generation logic 114 can iterate through the hardware array and identify all bits that equal "0+X" or "K−X". The processing logic can increment X and repeat the search. The selection vector generation logic 114 can repeat the search until "N of the M" entropy elements are identified. For example, the selection vector generation logic 114 can repeat the search until the Hamming weight of the M-bit selector vector is equal to N.

A process of the collection, accumulation, and search for accumulated Hamming weight value to identify random-but-stable bits in the M-bit output 410 from the PUF entropy pool 402 is illustrated and described below with respect to FIG. 5.

Figure 5:
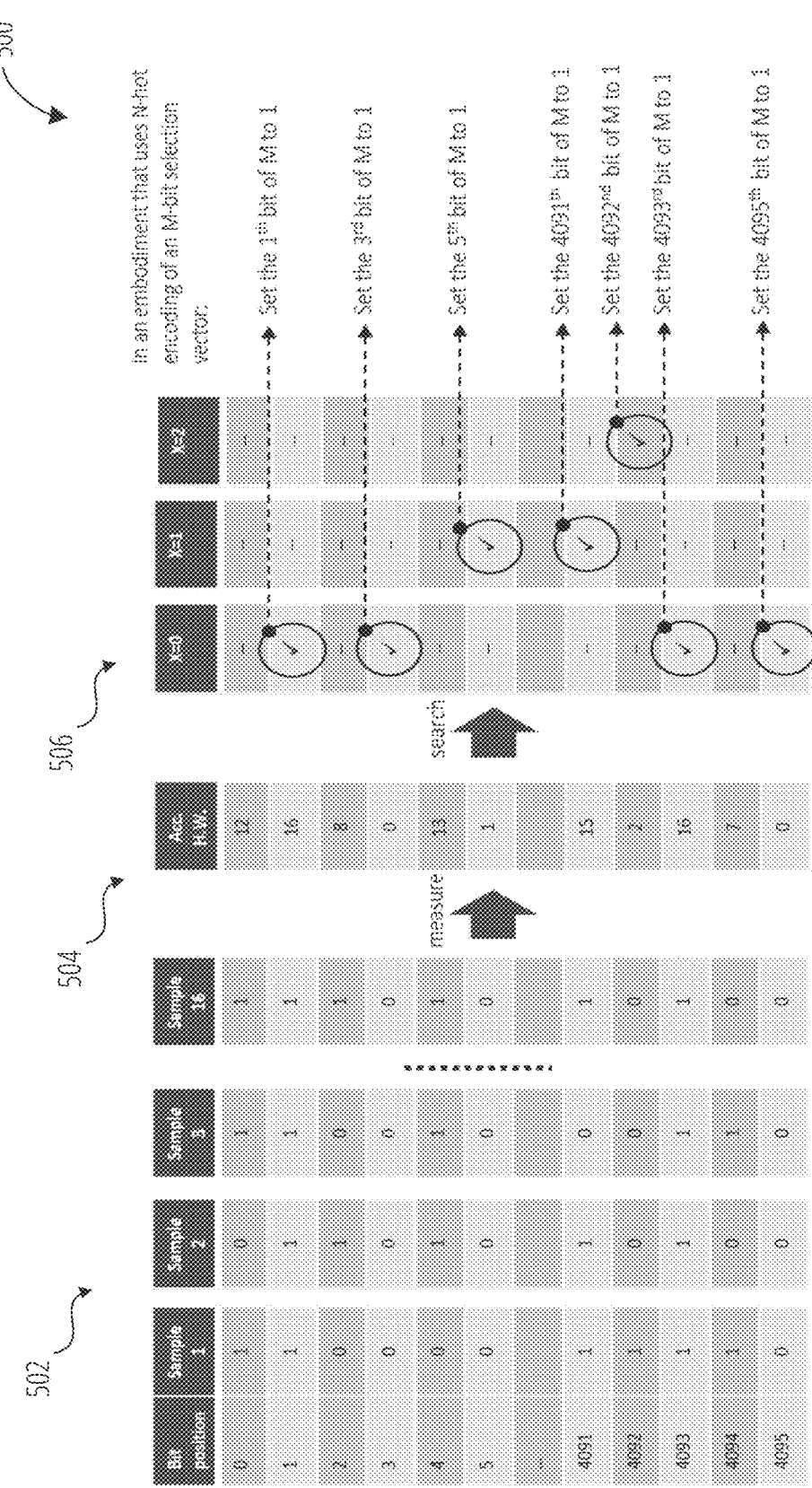
FIG. 5 illustrates a process including collection of samples, accumulation of Hamming weight values, and searching the accumulated Hamming weight values to identify N bits of an M-bit selection vector according to at least one embodiment.

FIG. 5 illustrates a process 500 including a collection of samples, accumulating Hamming weight values, and searching the accumulated Hamming weight values to identify N bits of an M-bit selection vector according to at least one embodiment. In a collection phase 502, the selection vector generation logic 114 obtains 16 samples of 4096 entropy elements of the PUF entropy pool 402. Each sample has 4096 bits in 4096 bit positions. After collecting the 16 samples in the collection phase 502, the selection vector generation logic 114 accumulates a Hamming weight value for each bit position. For example, for the bit position 0, there are twelve 1 bits in the 16 samples. For the bit position 1, there are sixteen 1 bits in the 16 samples. The selection vector generation logic 114 stores the accumulated Hamming weight values in an array, where each bit position of the array corresponds to a bit position of the 16 samples. After the accumulation phase 504, the selection vector generation logic 114 searches the array in one or more iterations. In at least one embodiment, the selection vector generation logic 114 uses an N-hot encoding of an M-bit selection vector. During the search phase 506, the selection vector generation logic 114 sets an offset value to zero (X=0) and searches the array for any bit positions with 0 or 16. The selection vector generation logic 114 sets the corresponding bits of the M-bit selection vector if the value is 0 or 16. In this example, with the offset value set to zero, the first bit, the third bit, the 4093rd bit, and the 4095th bit are set to 1. The selection vector generation logic 114 increments the offset value to one and searches the array for any bit position having a 1 or 15. In this example, with the offset values set to one, the 5th bit and the 4091st bit are set to 1. The selection vector generation logic 114 increments the offset value to two and searches the array for any bit position having a 2 or 14. In this example, with the offset values set to two, the 4092nd bit is set to 1. The search phase 506 can continue until N of the M-bit selection vector are set to one.

In another embodiment, instead of using an "N-hot encoding" of an M-bit selection vector, a $\log_2(M)$-bit address for each of the N elements could be included within helper data. For example, in a system with 4096 ($2^{12}$) entropy elements, bit position 13 might not be recorded as a logic '1' in the 13th bit position of an 4096-bit selection vector, it may alternatively be recorded as a 12-bit binary '000000001101' value, as a 3-digit hexadecimal value '00D', or even simply as a two-digit decimal number '13.'

In some cases, searching for Hamming weight values by starting a simple counter at "index 0" every time can tend to include lower address bits than upper address bits. In at least one embodiment, a maximum-length linear-feedback shift register (LSFR) could alternatively be used. In at least one embodiment, the maximum-length LFSR can address the hardware array (e.g., HW[0 . . . 'M−1'] array), where the maximum-length LFSR is randomly seeded by one of the M-bit samples from the PUF entropy pool 402. In another embodiment, during the search phase 506, the entropy elements identified with X≠0 could be interspersed between X=0 selections, so as to not potentially overwhelm the subsequent error correction circuit 420.

FIG. 6 is a flow diagram of a method 600 for generating a selection vector according to at least one embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by the PUF circuit 100 of FIG. 1. In another embodiment, the method 600 is performed by the selection vector generation logic 114 of FIG. 1. In another embodiment, the method 600 is performed by a device having the PUF circuit 100 of FIG. 1. In another embodiment, the method 600 is performed by a device having the PUF circuit 400 of FIG. 4.

Referring to FIG. 6, the method 600 begins by the processing logic sampling a set of entropy-generation elements to generate K samples (block 602). Each sample of the K samples has M-bits corresponding to M bit positions of an M-bit selection vector. The set of entropy-generation elements is reset between each sample being generated. At block 604, the processing logic determines an accumulated Hamming weight value for each of the M bit positions of the M-bit selection vector using the K samples. At block 606, the processing logic identifies, using the accumulated Hamming weight values, N bit positions in the M-bit selection vector, where M is larger than N. At block 608, the processing logic sets N bits corresponding to the N bit positions in the M-bit selection vector to a first logic state, where M-N bits of the M-bit selection vector are set to a second logic state. At block 610, the processing logic stores the M-bit selection vector as at least a portion of helper data associated with a device comprising the set of entropy-generation elements.

In a further embodiment, the processing logic at block 608, sets the N bits in the M-bit selection vector as part of an enrollment process. In at least one embodiment, during a regeneration process, the processing logic receives as inputs M binary values from the set of entropy-generation elements and the M-bit selection vector. The processing logic outputs N binary values responsive to the M-bit selection vector.

In a further embodiment, the processing logic determines the accumulated Hamming weight value for each of the M bit positions of the M-bit selection vector ack block 604 by counting a number of times a bit value of a corresponding bit position in the K samples is the first logic state and storing a count value equal to the number of times in a corresponding bit position of a hardware array having M bit positions corresponding to M bit positions of the M-bit selection vector. In at least one embodiment, the processing logic identifies the N bit positions in the M-bit selection value at block 606 by initializing an offset value, X, to zero and iterating through the hardware array to identify all bit positions having the count value equal to zero plus X or K minus X. The corresponding bit positions of the M-bit selection vector are set to the first logic state. The processing logic increments the offset value and continues iterating through the hardware array responsive to a number of bit positions of the M-bit selection vector set to the first logic state being less than the N bits.

In at least one embodiment, the processing logic determines the accumulated Hamming weight value for each of the M bit positions of the M-bit selection vector at block 604 by counting a number of times a bit value of a corresponding bit position in the K samples is the first logic state and storing a count value equal to the number of times in a corresponding bit position of a hardware array having M bit positions corresponding to M bit positions of the M-bit selection vector. The processing logic identifies the N bit positions in the M-bit selection value at block 606 by initializing an offset value, X, to zero and iterating through the hardware array to identify all bit positions having the count value equal to zero plus X or K minus X. When a bit is identified, the corresponding bit position within the M-bit selection vector is set to the first logic state. The processing logic continues iterating through the hardware array, and continues incrementing the offset value, responsive to a number of bit positions of the M-bit selection vector set to the first logic state being less than the N bits.

In at least one embodiment, the processing logic sets a first counter to K. The first counter is used to sample M binary values from the set of entropy-generation elements K times to obtain the K samples. The processing logic accumulates a total of M accumulated Hamming weight values for the K samples. After collecting the K samples, the processing logic initializes a second counter to zero and an offset value to zero. A value of the second counter represents a bit position in the M-bit selection vector. For each value of the second counter, the processing logic assesses the respective accumulated Hamming weight value to determine if the accumulated Hamming weight value equals K minus the offset value or zero plus the offset value and sets the corresponding bit position to the first logic state. Once all M accumulated Hamming weight values have been assessed, the processing logic resets the second counter and increments the offset value to obtain an incremented offset value. Whenever a bit position in the M-bit selection vector is set to the first logic state, the processing logic assesses whether a number of bit positions of the M-bit selection vector set to the first logic state is equal to N. In at least one embodiment, the processing logic continues to identify the N bit positions in the M-bit selection vector until the number of bit positions of the M-bit selection vector set to the first logic state is equal to N.

In at least one embodiment, for each value of the second counter, the processing logic selects one of the accumulated Hamming weight values to assess based on an output of a maximum-length LFSR whose sequence size is the same as M. In at least one embodiment, the processing logic derives a random value from one or more of the K samples from the set of entropy-generation elements and uses the random value to seed the maximum-length LFSR. As described herein, the processing logic can set the N bits in the M-bit selection vector during an enrollment process of a device comprising the set of entropy-generation elements.

Figure 7:
FIG. 7 illustrates an example device including a physically unclonable function (PUF) that uses a selection vector to generate a PUF output for one or more device component(s) according to at least one embodiment.

FIG. 7 illustrates an example device 700 including a physically unclonable function (PUF) 704 that uses a selection vector 702 to generate a PUF output 706 for one or more device component(s) 708 according to at least one embodiment. The device 700 may include an integrated circuit where a portion of the integrated circuit is associated with a physical variation corresponding to the physically unclonable function used to generate the PUF output 706.

As shown in FIG. 7, the device 700 may include the physically unclonable function 704, a memory 710, and device component(s) 708. The memory 710 may be a non-volatile memory of the device, and the physically unclonable function 704 may correspond to an integrated circuit or a structure or portion of an integrated circuit. Furthermore, the device component(s) 708 may be circuitry that performs functionality associated with a cryptographic operation. For example, the cryptographic operation may be to encrypt and/or decrypt input data by using the PUF output 706 that is generated by using the physically unclonable function 704.

The physically unclonable function 704 may generate the PUF output 706 based on a physical variation of the PUF 704 and helper data 712 from the memory 710. For example, the physically unclonable function 704 may receive the helper data 712 with the selection vector 702. The physically unclonable function 704 may generate helper data 712 based on the selection vector 702, which is determined during an enrollment process as described herein. The PUF 704 can provide the helper data 712 to the memory 710 to be stored and used during a regeneration process described herein. In some embodiments, the physical variation of the physically unclonable function 704 may correspond to multiple values. For example, a first value may correspond to a first physical variation in the structure of the physically unclonable function 704, and a second value may correspond to a second physical variation in the structure of the physically unclonable function 704. In some embodiments, if the physically unclonable function 704 corresponds to an entropy pool of entropy-generation elements, then the first physical variation may correspond to whether a first bit of a first entropy-generation element is more biased towards a value of '0' or a value of '1' at initialization or startup of the device 700 and the second physical variation may correspond to whether a second bit of a second entropy-generation element is more biased towards a value of '0' or a value of '1' at initialization or startup of the device 700. Thus, different physical variations in the structure of the physically unclonable function 704 may each correspond to a different bit that may be used to generate the selection vector 702, as well as the helper data 712 stored in the memory 710. The selection vector 702 may identify which particular bits corresponding to the different physical variations of the physically unclonable function 704 should be selected and used to generate the PUF output 706.

As an example, the PUF output 706 may be a value derived (after error correction) from the value '00110.' The physically unclonable function 704 may provide values '001111111110' as a result of its different physical variations. The selection vector 702 may identify that the first four most-significant bits '0011' and the least significant bit '0' should be selected from the physically unclonable function 704 to contribute to generation of the PUF output 706. In some embodiments, if the physically unclonable function 704 corresponds to an entropy pool of entropy-generation elements, then the helper data 712 may correspond to code words and the output of the physically unclonable function 704 to obtain a random-but-stable PUF output 706.

Referring to FIG. 7, the helper data 712 may be stored in the memory 710 after being generated by the physically unclonable function 704. Subsequently, the device component(s) 708 may request that the PUF output 706 be provided. In response, the helper data 712, including the selection vector 702, may be provided to the physically unclonable function 704 to generate the subsequent PUF output 706 that may match the original target data used to generate the helper data 712. In some embodiments, the subsequent PUF output 706 may correspond to a cryptographic key to be used by the device component(s) 708 or a value that is used to generate the cryptographic key.

Figure 8:
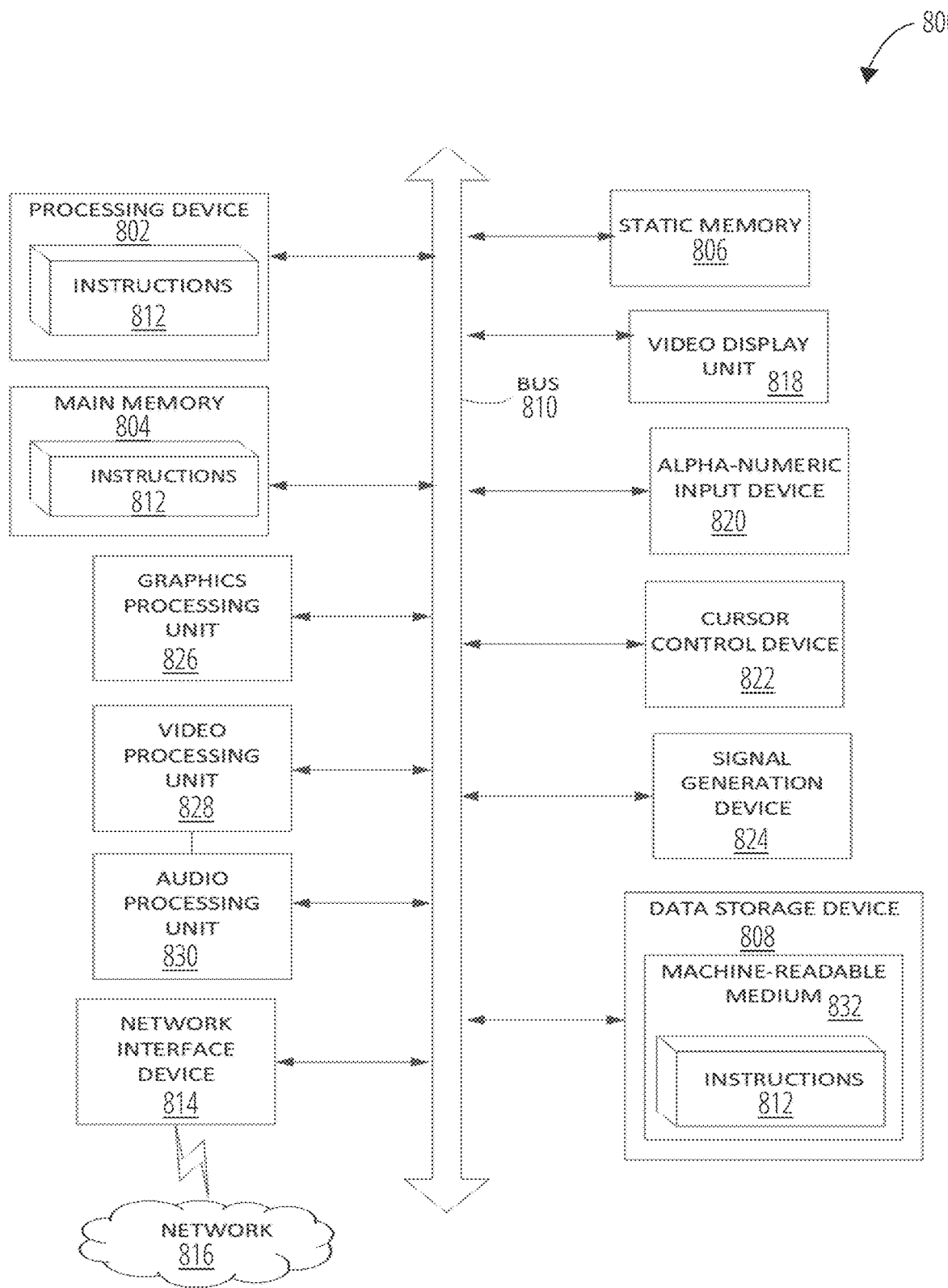
FIG. 8 illustrates a block diagram of an embodiment of a computer system in which some embodiments of the disclosure may operate.

FIG. 8 illustrates a block diagram of an embodiment of a computer system 800 within which a set of instructions, for causing the machine to perform any one or more of the methodologies discussed herein, may be executed. In alternative implementations, the machine may be connected (e.g., networked) to other machines in a local area network (LAN), an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 808, which communicate with each other via a bus 810.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices, such as an application-specific integrated circuit (ASIC), a field programmable gate array (FPGA), a digital signal processor (DSP), a network processor, or the like. The processing device 802 is configured to execute instructions 812 for performing the operations and steps discussed herein.

The computer system 800 may further include a network interface device 814 to communicate over the network 816. The computer system 800 also may include a video display unit 818 (e.g., a liquid crystal display (LCD) or a cathode ray tube (CRT)), an alpha-numeric input device 820(e.g., a keyboard), a cursor control device 822 (e.g., a mouse), a signal generation device 824 (e.g., a speaker), a graphics processing unit 826, a video processing unit 828, and audio processing unit 830.

The data storage device 808 may include a machine-readable storage medium 832 (also known as a computer-readable storage medium) on which is stored one or more sets of instructions 812 or software embodying any one or more of the methodologies or functions described herein. The instructions 812 may also reside, completely or at least partially, within the main memory 804 and/or within the processing device 802 during execution thereof by the computer system 800, the main memory 804 and the processing device 802 also constituting machine-readable storage media.

In one implementation, the instructions 812 include instructions to implement functionality as described herein. While the machine-readable storage medium 832 is shown in an example implementation to be a single medium, the term "machine-readable storage medium" should be taken to include a single medium or multiple media (e.g., a centralized or distributed database and/or associated caches and servers) that store the one or more sets of instructions. The term "machine-readable storage medium" shall also be taken to include any medium capable of storing or encoding a set of instructions for execution by the machine that causes the machine to perform any one or more of the methodologies of the present disclosure. The term "machine-readable storage medium" shall accordingly be taken to include, but not be limited to, solid-state memories, optical media, and magnetic media.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

It is to be understood that the above description is intended to be illustrative and not restrictive. Many other implementations will be apparent to those of skill in the art upon reading and understanding the above description. Therefore, the disclosure scope should be determined with reference to the appended claims, along with the full scope of equivalents to which such claims are entitled.

In the above description, numerous details are set forth. It will be apparent, however, to one skilled in the art that the aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, which may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A device comprising:
a set of entropy-generation elements which, in response to a sample signal, provide at least M binary values; and
a selector circuit coupled to the set of entropy-generation elements, the selector circuit to receive as input the M binary values from the set of entropy-generation elements and output N binary values, responsive to an M-bit selection vector, wherein M is larger than N, wherein N bits in the M-bit selection vector are set to a first logic state, wherein M-N bits of the M-bit selection vector are set to a second logic state, wherein a determination of which N bits in the M-bit selection vector are set to the first logic state is determined by:
generating K samples from the set of entropy-generation elements, wherein each sample of the K samples has M-bits corresponding to M bit positions of the M-bit selection vector, and wherein the set of entropy-generation elements is reset between each sample being generated;
determining an accumulated Hamming weight value for each of the M bit positions of the M-bit selection vector using the K samples;
identifying, using the accumulated Hamming weight values, N bit positions in the M-bit selection vector; and
setting the N bits corresponding to the N bit positions in the M-bit selection vector to the first logic state.

2. The device of claim 1, further comprising a hardware array having M bit positions corresponding to the M bit positions of the M-bit selection vector, wherein:
determining the accumulated Hamming weight value for each bit position of the M-bit selection vector comprises:
counting a number of times a bit value of the corresponding bit position is the first logic state; and
storing a count value equal to the number of times in the corresponding bit position of the hardware array; and
identifying the N bit positions in the M-bit selection vector comprises:
initializing an offset value, X, to zero;
iterating through the hardware array to identify all bit positions having the count value equal to zero plus X or K minus X, wherein the corresponding bit positions of the M-bit selection vector are set to the first logic state; and
incrementing the offset value and continuing the iterating through the hardware array responsive to a number of bit positions of the M-bit selection vector set to the first logic state being less than the N bits.

3. The device of claim 1, wherein the determination of which N bits in the M-bit selection vector are set to the first logic state is determined during an enrollment process of the device.

4. The device of claim 1, wherein the determination of which N bits in the M-bit selection vector are set to the first logic state is further determined by:
setting a first counter to K;
sampling, using the first counter, M binary values from the set of entropy-generation elements K times to obtain the K samples;
accumulating a total of M accumulated Hamming weight values for the K samples;
after collecting the K samples, initializing a second counter to zero and an offset value to zero, wherein a value of the second counter represents a bit position in the M-bit selection vector;
for each value of the second counter, assessing the respective accumulated Hamming weight value to determine if the accumulated Hamming weight value equals K minus the offset value or zero plus the offset value and setting the corresponding bit position to the first logic state;
once all M accumulated Hamming weight values have been assessed, resetting the second counter and incrementing the offset value to obtain an incremented offset value; and
whenever a bit position in the M-bit selection vector is set to the first logic state, assessing whether a number of bit positions of the M-bit selection vector set to the first logic state is equal to N, wherein the determination of which N bits in the M-bit selection vector are set to the first logic state continues until the number of bit positions of the M-bit selection vector set to the first logic state is equal to N.

5. The device of claim 4, further comprising a maximum-length linear-feedback shift register (LFSR) whose sequence size is the same as M, wherein, for each value of the second counter, a selection of which accumulated Hamming weight value to assess is determined by an output of the maximum-length LFSR.

6. The device of claim 5, wherein the maximum-length LFSR is seeded with a random value derived from one or more of the K samples from the set of entropy-generation elements.

7. The device of claim 1, further comprising processing logic coupled to the set of entropy-generation elements and the selector circuit, wherein the processing logic is to determine which N bits in the M-bit selection vector are set to the first logic state.

8. A method comprising:
sampling a set of entropy-generation elements to generate K samples, wherein each sample of the K samples has M-bits corresponding to M bit positions of an M-bit selection vector, and wherein the set of entropy-generation elements is reset between each sample being generated;
determining an accumulated Hamming weight value for each of the M bit positions of the M-bit selection vector using the K samples;
identifying, using the accumulated Hamming weight values, N bit positions in the M-bit selection vector, wherein M is larger than N;
setting N bits corresponding to the N bit positions in the M-bit selection vector to a first logic state, wherein M-N bits of the M-bit selection vector are set to a second logic state; and
storing the M-bit selection vector as at least a portion of helper data associated with a device comprising the set of entropy-generation elements.

9. The method of claim 8, wherein setting the N bits in the M-bit selection vector is performed in an enrollment process, wherein, as part of a regeneration process, the method further comprises:

receiving as inputs M binary values from the set of entropy-generation elements;

receiving the M-bit selection vector; and outputting N binary values, responsive to the M-bit selection vector.

10. The method of claim 8, wherein:

determining the accumulated Hamming weight value for each of the M bit positions of the M-bit selection vector comprises:

counting a number of times a bit value of a corresponding bit position in the K samples is the first logic state; and storing a count value equal to the number of times in a corresponding bit position of a hardware array having M bit positions corresponding to M bit positions of the M-bit selection vector; and identifying the N bit positions in the M-bit selection vector comprises:

initializing an offset value, X, to zero;

iterating through the hardware array to identify all bit positions having the count value equal to zero plus X or K minus X, wherein the corresponding bit positions of the M-bit selection vector are set to the first logic state; and incrementing the offset value and continuing iterating through the hardware array responsive to a number of bit positions of the M-bit selection vector set to the first logic state being less than the N bits.

11. The method of claim 8, further comprising:

setting a first counter to K, wherein the first counter is used to sample M binary values from the set of entropy-generation elements K times to obtain the K samples;

accumulating a total of M accumulated Hamming weight values for the K samples;

after collecting the K samples, initializing a second counter to zero and an offset value to zero, wherein a value of the second counter represents a bit position in the M-bit selection vector;

for each value of the second counter, assessing the respective accumulated Hamming weight value to determine if the accumulated Hamming weight value equals K minus the offset value or zero plus the offset value and setting the corresponding bit position to the first logic state;

once all M accumulated Hamming weight values have been assessed, resetting the second counter and incrementing the offset value to obtain an incremented offset value; and whenever a bit position in the M-bit selection vector is set to the first logic state, assessing whether a number of bit positions of the M-bit selection vector set to the first logic state is equal to N, wherein the identifying the N bit positions in the M-bit selection vector continues until the number of bit positions of the M-bit selection vector set to the first logic state is equal to N.

12. The method of claim 11, wherein, for each value of the second counter, selecting one of the accumulated Hamming weight values to assess based on an output of a maximum-length linear-feedback shift register (LFSR) whose sequence size is the same as M.

13. The method of claim 12, further comprising:

deriving a random value from one or more of the K samples from the set of entropy-generation elements; and using the random value to seed the maximum-length LFSR.

14. The method of claim 8, wherein setting the N bits in the M-bit selection vector is performed in an enrollment process of a device comprising the set of entropy-generation elements.

15. An integrated circuit comprising:

a set of entropy-generation elements which, in response to a sample signal, provide at least M binary values; and a selector circuit coupled to the set of entropy-generation elements, the selector circuit to receive as input the M binary values from the set of entropy-generation elements and output N binary values, responsive to an M-bit selection vector, wherein M is larger than N, wherein N bits in the M-bit selection vector are set to a first logic state, wherein M-N bits of the M-bit selection vector are set to a second logic state; and processing logic coupled to the set of entropy-generation elements, wherein the processing logic, to determine which N bits in the M-bit selection vector are set to the first logic state, is to:

generate K samples from the set of entropy-generation elements, wherein each sample of the K samples has M-bits corresponding to M bit positions of the M-bit selection vector, and wherein the set of entropy-generation elements is reset between each sample being generated;

determine an accumulated Hamming weight value for each of the M bit positions of the M-bit selection vector using the K samples;

identify, using the accumulated Hamming weight values, N bit positions in the M-bit selection vector; and set the N bits corresponding to the N bit positions in the M-bit selection vector to the first logic state.

16. The integrated circuit of claim 15, further comprising a hardware array having M bit positions corresponding to the M bit positions of the M-bit selection vector, wherein the processing logic is further to:

count a number of times a bit value of the corresponding bit position is the first logic state;

store a count value equal to the number of times in the corresponding bit position of the hardware array;

initialize an offset value, X, to zero;

iterate through the hardware array to identify all bit positions having the count value equal to zero plus X or K minus X, wherein the corresponding bit positions of the M-bit selection vector are set to the first logic state; and increment the offset value and continue iterating through the hardware array responsive to a number of bit positions of the M-bit selection vector set to the first logic state being less than the N bits.

17. The integrated circuit of claim 15, wherein the processing logic is to determine which N bits in the M-bit selection vector are set to the first logic state during an enrollment process of the integrated circuit.

18. The integrated circuit of claim 15, wherein the processing logic is to generate helper data comprising the M-bit selection vector during an enrollment process of the integrated circuit.

19. The integrated circuit of claim 15, wherein the processing logic is further to:

set a first counter to K;

sample, using the first counter, M binary values from the set of entropy-generation elements K times to obtain the K samples;

accumulate a total of M accumulated Hamming weight values for the K samples;

after collecting the K samples, initialize a second counter to zero and an offset value to zero, wherein a value of the second counter represents a bit position in the M-bit selection vector;

for each value of the second counter, assess the respective accumulated Hamming weight value to determine if the accumulated Hamming weight value equals K minus the offset value or zero plus the offset value and setting the corresponding bit position to the first logic state;

once all M accumulated Hamming weight values have been assessed, reset the second counter and increment the offset value to obtain an incremented offset value; and whenever a bit position in the M-bit selection vector is set to the first logic state, assess whether a number of bit positions of the M-bit selection vector set to the first logic state is equal to N, wherein the processing logic is to continue until the number of bit positions of the M-bit selection vector set to the first logic state is equal to N.

20. The integrated circuit of claim 19, further comprising a maximum-length linear-feedback shift register (LFSR) whose sequence size is the same as M, wherein, for each value of the second counter, a selection of which accumulated Hamming weight value to assess is determined by an output of the maximum-length LFSR.

\* \* \* \* \*